(12) United States Patent (10) Patent No.: US 12,612,819 B2
Sato (45) Date of Patent: Apr. 28, 2026

(54) PRESSURE TRANSDUCING GASKET SYSTEMS

(71) Applicant: Arconic Technologies LLC, Pittsburgh, PA (US)

(72) Inventor: Lester Taku Sato, Liverpool (GB)

(73) Assignee: Arconic Technologies LLC, Pittsburgh, PA (US)

( * ) Notice: Subject to any disclaimer, the term of this patent is extended or adjusted under 35 U.S.C. 154(b) by 258 days.

(21) Appl. No.: 18/530,019

(22) Filed: Dec. 5, 2023

(65) Prior Publication Data

US 2024/0210341 A1 Jun. 27, 2024

Related U.S. Application Data

(60) Provisional application No. 63/476,863, filed on Dec. 22, 2022.

(51) Int. Cl.
| | |
|---|---|
| *E06B 3/24* | (2006.01) |
| *E04B 2/88* | (2006.01) |
| *E04B 2/90* | (2006.01) |
| *E04B 2/96* | (2006.01) |
| *E06B 3/54* | (2006.01) |

(Continued)

(52) U.S. Cl.
CPC .............. *E06B 3/24* (2013.01); *E04B 2/885* (2013.01); *E04B 2/90* (2013.01); *E04B 2/965* (2013.01); *E04B 2/967* (2013.01); *E06B 3/5427* (2013.01); *E06B 7/16* (2013.01); *G01N 27/041* (2013.01); *G08B 21/18* (2013.01)

(58) Field of Classification Search
CPC . E04B 2/885; E04B 2/90; E04B 2/965; E04B 2/967; E06B 3/24; E06B 3/5427; E06B 3/677; E06B 7/16; G01N 27/041; G08B 21/18
See application file for complete search history.

(56) References Cited

U.S. PATENT DOCUMENTS

| | | | | |
|---|---|---|---|---|
| 5,592,795 A | * | 1/1997 | Rinehart | E04B 2/967 |
| | | | | 52/235 |
| 2006/0185274 A1 | * | 8/2006 | Merica | E06B 7/28 |
| | | | | 52/235 |

(Continued)

FOREIGN PATENT DOCUMENTS

| | | |
|---|---|---|
| DE | 3419526 A1 | 11/1985 |
| DE | 102010024486 A1 | 2/2011 |

(Continued)

OTHER PUBLICATIONS

Extended European Search Report from corresponding EP Application No. 23215158.9 mailed May 8, 2024.

*Primary Examiner* — Jessie T Fonseca
(74) *Attorney, Agent, or Firm* — Vorys, Sater, Seymour and Pease LLP

(57) ABSTRACT

A fenestration system includes opposing first and second rigid components, a gasket interposing the first and second rigid components, the gasket being made of an electrically-conductive material and exhibiting a baseline resistance when arranged between the first and second rigid components, and a control system communicably coupled to the gasket with one or more wires and operable to monitor a real-time resistance of the gasket and generate a signal when the real-time resistance deviates from the baseline resistance.

20 Claims, 4 Drawing Sheets

(51) Int. Cl.
    *E06B 7/16*          (2006.01)
    *G01N 27/04*         (2006.01)
    *G08B 21/18*         (2006.01)

(56)                    References Cited

U.S. PATENT DOCUMENTS

| | | | | |
|---|---|---|---|---|
| 2014/0186556 | A1 * | 7/2014 | Dear | E06B 3/6612 |
| | | | | 428/34 |
| 2017/0022708 | A1 * | 1/2017 | Dolby | E06B 3/5481 |
| 2017/0298621 | A1 * | 10/2017 | Frederick | E04B 2/967 |
| 2019/0194939 | A1 * | 6/2019 | Frederick | E04B 2/967 |
| 2021/0388665 | A1 * | 12/2021 | Zimmermann | E06B 3/549 |

FOREIGN PATENT DOCUMENTS

| | | | | | |
|---|---|---|---|---|---|
| EP | 0980460 | A1 | 2/2000 | | |
| EP | 1396831 | A1 | 3/2004 | | |
| EP | 1762689 | A2 | 3/2007 | | |
| WO | WO-9745818 | A1 * | 12/1997 | | G08B 13/04 |
| WO | WO-9850666 | A1 * | 11/1998 | | E06B 5/113 |

* cited by examiner

EXTERIOR

INTERIOR

300

316

314

318b

318a

302

304

310

312

306

308b

308a

EXTERIOR

INTERIOR

PRESSURE TRANSDUCING GASKET SYSTEMS

CROSS-REFERENCE TO RELATED APPLICATIONS

The present application is a U.S. non-provisional patent application claiming priority to U.S. Provisional Patent Appln. Ser. No. 63/476,863, filed on Dec. 22, 2022, the contents of which are hereby incorporated by reference in their entirety.

FIELD OF THE DISCLOSURE

The present disclosure relates generally to building enclosures and, more particularly, to using building fenestration system glazing or seal gaskets as pressure transducers.

BACKGROUND OF THE DISCLOSURE

When finishing the fenestration of a building, it has become commonplace within the industry to include sensors within the fenestration system. Incorporation of sensors and sensor systems fulfills either a security or wellbeing role. For example, sensors may be designed to detect damage to the system (e.g., broken window, door, etc.), tampering with a seal of the system, as well as reporting the real-time status of the fenestration system (e.g., open, closed, locked, unlocked, etc.).

Some fenestration systems include advanced sensors that provide an early warning system for detecting tapping, banging, vibration, forced entry, etc. on a fenestration system. However, these vibration sensors only detect if an intruder is trying to break the window or the door by hitting it. Such vibration sensors would not detect someone attempting to pick the gasket of a window and carefully removing the glass.

The sensors may be after-market devices that are retro-fitted by the end user, or may be installed during the initial installation of the fenestration system. In both of these cases, additional tooling and preparation may be required to accommodate the added hardware. Further, these sensor systems are rarely universal, in that special sensor systems must be designed for windows, doors, and vents separately.

Thus, there is a need for a universally applicable sensor system for fenestration systems with a reduced footprint, such that any opening within a building may be properly monitored and maintained.

SUMMARY OF THE DISCLOSURE

Embodiments disclosed herein include a fenestration system that includes opposing first and second rigid components, a gasket interposing the first and second rigid components, the gasket being made of an electrically-conductive material and exhibiting a baseline resistance when arranged between the first and second rigid components, and a control system communicably coupled to the gasket with one or more wires and operable to monitor a real-time resistance of the gasket and generate a signal when the real-time resistance deviates from the baseline resistance. In a further embodiment of the fenestration system, the electrically-conductive material is selected from the group consisting of ethylene propylene diene monomer rubber, a conductive foam, a conductive elastomer, and any combination thereof. In another further embodiment of the fenestration system, the fenestration system further includes comprising a power source that provides electrical power the control system and the one or more wires. In another further embodiment of the fenestration system, the fenestration system further includes a control unit communicably coupled to the control system and operable to provide a visual display of a status of the control system, report the status to a building management system, report the status to a smart home system, or any combination thereof. In another further embodiment of the fenestration system, wherein the real-time resistance deviates from the baseline resistance when the gasket undergoes a disturbance. In another further embodiment of the fenestration system, three or more wires are coupled to the gasket at predefined intervals and wherein a localized, real-time resistance is measured between two of the three or more wires. In another further embodiment of the fenestration system, the fenestration system comprises a window assembly and the first rigid component comprises a sill and the second rigid component comprises a panel comprising one or more window panes. In another further embodiment of the fenestration system, the fenestration system comprises a window assembly and the first rigid component comprises a sill and the second rigid component comprises a sill receptor. In another further embodiment of the fenestration system, the fenestration system comprises a door assembly and the first rigid component comprises a stile and the second component comprises a panel comprising one or more panes of glass. In another further embodiment of the fenestration system, the fenestration system comprises a door assembly and the first rigid component comprises a door frame and the second component comprises a door. In another further embodiment of the fenestration system, the fenestration system comprises a curtain wall assembly and the first rigid component comprises a mullion or transom or a pressure plate and the second rigid component comprises one or more glazing panels. In another further embodiment of the fenestration system, the fenestration system comprises a curtain wall assembly comprising a mullion or transom, a pressure plate, and a fastener, and wherein installation of the fastener is monitored through the real-time resistance of the gasket installed within the curtain wall assembly. In another further embodiment of the fenestration system, the gasket operates as a glazing or sealing gasket. In another further embodiment of the fenestration system, the fenestration system further includes an alarm in communication with the control system and operable to generate an audible or visual alarm upon receipt of the signal.

Embodiments disclosed herein may further include a method of monitoring a fenestration system, the method may include measuring a baseline resistance across a gasket forming part of the fenestration system, the fenestration system further including opposing first and second rigid components, the gasket interposing the first and second rigid components and being made of an electrically-conductive material, and a control system communicably coupled to the gasket with one or more wires. The method may further include monitoring a real-time resistance of the gasket with the control system, and generating a signal with the control system when the real-time resistance deviates from the baseline resistance. In a further embodiment of the method, measuring the baseline resistance across the gasket comprises measuring the baseline resistance when the gasket is arranged between the first and second rigid components. In another further embodiment of the method, the method may further include at least one of providing a visual display of a status of the control system with a control unit communicably coupled to the control system, report the status to a building management system with the control unit, and report the status to a smart home system with the control unit. In another further embodiment of the method, the method may further include subjecting the gasket to a disturbance and thereby deviating the real-time resistance from the baseline resistance. In another further embodiment of the method, the method may further include performing a sealing function with the gasket. In another further embodiment of the method, generating the signal comprises triggering an alarm in communication with the control system.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combination, and equivalents in form and function, without departing from the scope of this disclosure.

DETAILED DESCRIPTION

The present disclosure relates generally to building enclosures and, more particularly, to using building fenestration system glazing or seal gaskets as pressure transducers.

The embodiments disclosed herein describe a system in which a glazing or seal gasket for a fenestration system is employed as a pressure transducer for determining damage or tampering with an enclosing component, such as a door, a window, or a vent. Alternatively, the gasket of the fenestration system may be utilized in reporting the real-time status of the system such as "open" or "closed", or to verify the correct installation of beading and pressure plates. The conductive electrical properties of the gasket materials may enable these sensing capabilities within existing fenestration systems, while new systems may use a variety of conductive gasket materials to achieve the same effect.

The glazing or seal gaskets described herein and used in windows, doors, or vents may be used as a sensor, specifically as a pressure sensor, thus negating the need for a separate sensor to be installed in a fenestration system. In addition to time and cost savings, the gasket could act (dependent on the electrical configuration) is a perimeter sensor rather than a point sensor, which is the current (conventional) sensor methodology. Thus, the gasket may be able to detect changes at any point of the system, including if an intruder might be attempting pick (remove) the gasket, which can be particularly important in healthcare installations and settings.

As used herein, the terms "building fenestration system," "fenestration system," and variants thereof, refer to an enclosing component or member of a building, such as a door, a window, or a vent (e.g., fixed or movable/pivotable), which include one or more glazing or seal gaskets.

Figure 1:
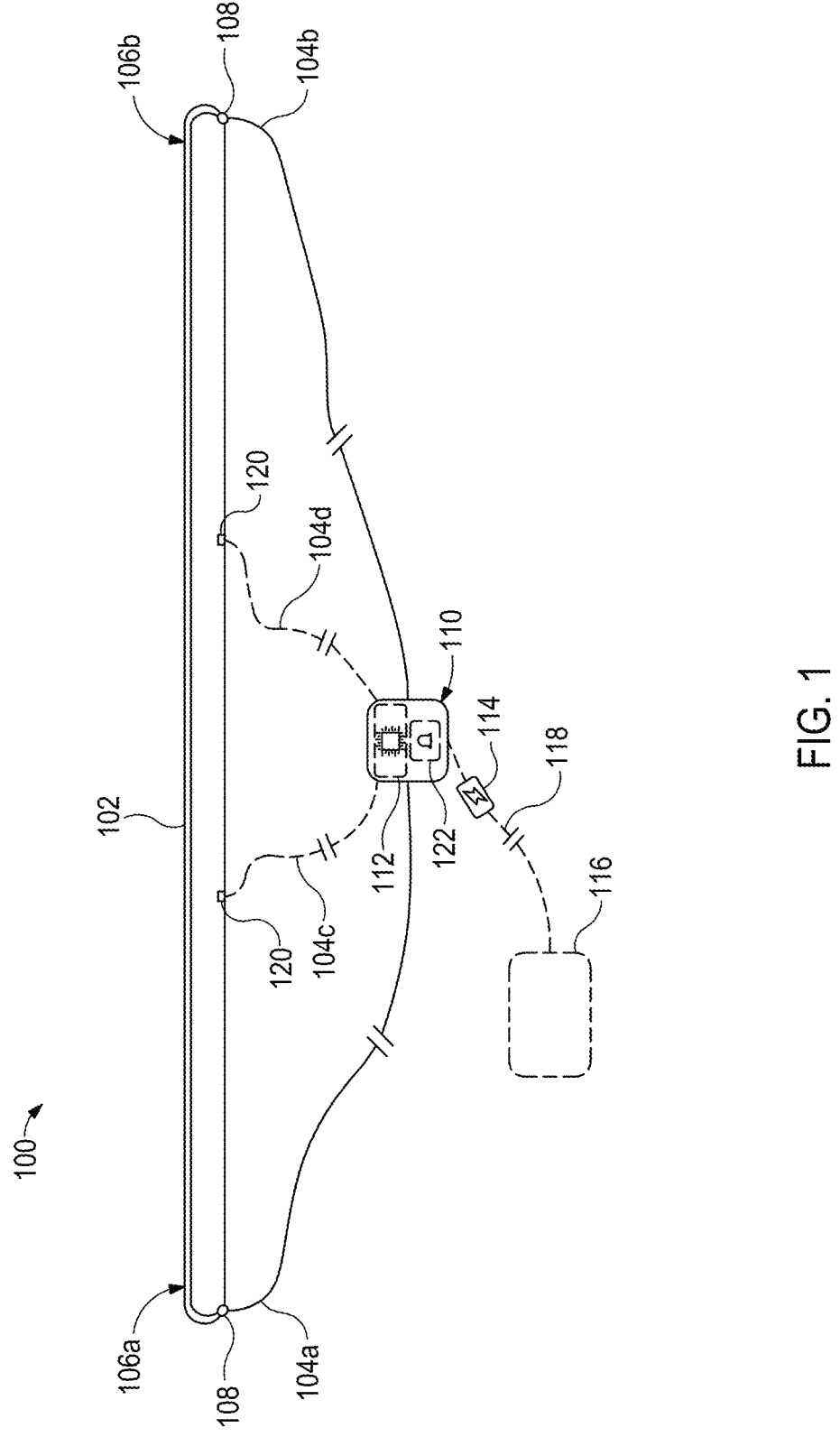
FIG. 1 is a schematic diagram of an example pressure transducing gasket system according to one or more embodiments.

FIG. 1 is a schematic diagram of an example pressure transducing gasket system 100, according to one or more embodiments of the present disclosure. The pressure transducing gasket system 100 (hereinafter, "the system 100") may include a gasket 102 comprising or otherwise being used as a glazing or sealing gasket for a fenestration system. The gasket 102 is not limited its use or installation location in any type of conventional fenestration system. Accordingly, the system 100 may be used in any type of door, window, or vent, without departing from the scope of the present disclosure.

According to embodiments of the present disclosure, beyond providing a general sealing function, the gasket 102 may also be used as a type of pressure sensor. More specifically, the gasket 102 may be made of an electrically-conductive material capable of changing conductivity as a function of applied pressure. In some embodiments, for example, the gasket 102 may be made of ethylene propylene diene monomer (EPDM) rubber. While relatively resistive in nature, EPDM is nonetheless a conductive material and its conductivity will change as a function of pressure applied to the EPDM material. In other embodiments, the gasket 102 may alternatively be made from other electrically-conductive materials including, but not limited to, a conductive foam, a conductive elastomer, or any other conductive material which may also form a seal, without departing from the scope of this disclosure.

The conductive nature of the gasket 102 may be harnessed through the attachment of a plurality of wires 104 selectively placed at known locations along the length of the gasket 102. In the illustrated embodiment, two wires 104a and 104b are electrically coupled to the gasket 102 at opposing ends 106a and 106b of the gasket 102. This allows the gasket 102 to act as a pressure-sensitive resistor mounted between the wires 104a,b. In some applications, the wires 104a,b may be mounted to the gasket at corresponding electrical ports 108 provided within or on the gasket 102. In some embodiments, the ports 108 may comprise predefined connections within the gasket 102 for the inclusion of the wiring. In other embodiments, however, the ports 108 may lack a defined structure and may exist only as an insertion or clamping point of the wires 104 to the gasket 102. In yet other embodiments, the ports 108 may take the form of an electrode, or other electrified device, which may be applied at the location shown as the port 108 such that the wires 104a,b and the gasket 102 are placed in electrical communication.

With the gasket 102 acting as a resistor between the wires 104a,b, a baseline resistance may be determined across the gasket 102. In some embodiments, the baseline resistance may be measured after installing the gasket 102 within a fenestration system, such that the baseline may be determined for an in-use system. After determining the baseline resistance, any further (future) deformation to the gasket 102 may yield a differing resistance across the wires 104a,b, thereby allowing the system 100 to act as a traditional pressure transducer.

The wires 104a,b may be further connected to a control system 110 included in the system 100. The control system 110 may be configured to monitor a real-time resistance of the gasket 102 and generate a signal when the real-time resistance varies (deviates) from a predetermined (pre-recorded) baseline resistance of the gasket 102, such that the resistance and any change thereof may be measured and utilized. The real-time resistance may be measured in a variety of time scales including, but not limited to, one millisecond, one second, one minute, one hour, or one day, based upon the desired time resolution and function of the system 100. The control system 110 may include a processor 112 programmed to perform advanced calculations and actions as a part of the system 100. In alternate embodiments, however, the control system 110 may be a simple logic circuit configured to compare the resistance across the wires 104*a,b* and trigger an alarm when the resistance deviates from a predetermined established value (e.g., the baseline resistance).

Either in series as shown, or separately connected to the system 100, a power source 114 may be included in the system 100 to provide electrical power the various component parts of the system 100. In some embodiments, the power source 114 may be configured to provide a constant voltage to the analog circuit of the system 100 to allow for direct measurement of resistance changes. In other embodiments, the power source 114 may be configured to provide intermittent power (e.g., at a 1 Hz sample rate) to the system 100 to reduce overall power consumption.

In some embodiments, the power source 114 may comprise one or more batteries or a battery pack electrically coupled to the control system 110. In such embodiments, the battery(ies) may be rechargeable or disposable. Moreover, in such embodiments, the system 100 may be wireless, with communication being conducted through wireless means, such as Bluetooth technology. In other embodiments, however, the power source 114 may comprise the power mains of the building where the given fenestration system is located. In such embodiments, the control system 110 may be communicably coupled to grid electrical power to provide the required electrical power for the system 100.

In some applications, the system 100 may further include a control unit 116 (shown in dashed lines) communicably coupled to the control system 110 via one or more communication links 118 (shown in dashed lines). The communication link 118 may allow the control system 110 to communicate with the control unit 116 via any wired or wireless means. The control unit 116 may comprise a computing device, such as a computer or server, which reads the real-time status or values produced by the control system 110, or may be a display device (e.g., a graphical user interface "GUI") which visually represents (displays) the real-time status of the system 100. The control unit 116 may be operated as part of a building management system in commercial buildings, or may be integrated with an open or closed protocol within an existing smart home system in residential buildings.

As will be appreciated, several systems 100 may be connected to a common control unit 116, such that each gasket 102 of each system in each fenestration system of a building can be controlled and/or monitored using the same control unit 116. Further, a single fenestration unit may utilize multiple systems 100, such that a single door may use four gaskets 102 as one system 100, where each gasket 102 is arranged (positioned) at a corresponding one of the four edges of the door.

In some embodiments, the system 100 may further include one or more additional ports 120 at locations other than the ends 106*a,b* of the gasket 102. The additional ports 120 may be selectively placed (located) at known or predefined intervals along the length of the gasket 102 between the ends 106*a,b*, and may be communicably connected to the control system 110 with one or more additional wires 104*c* and 104*d* (shown as dashed lines). The additional ports 120 and wires 104*c,d* may prove advantageous in converting the gasket 102 into a higher resolution sensor. More specifically, including the additional ports 120 in the system 100 facilitates localized, real-time resistance measurements between the ports 108 and the additional ports 120, thus helping to more accurately determine the particular location of tampering or damage to the gasket based upon the resistance differences between the individual ports 108, 120. The resolution of the gasket 102 may be increased through an increased number of additional ports 120, such that the distance between resistance readings is reduced.

In some embodiments, the wires 104*a-d* may be run through the fenestration system itself, such that the wires 104*a-d* may not be visible or easily reached to prevent tampering. In such embodiments, for example, one or more of the wires 104*a-d* may be embedded within the material of the gasket 102 and thereby be used in a tamper detection application. More specifically, if an individual attempted to remove the gasket 102, the tamper detection system would be alerted by disruption of the conductive wires 104*a-d*. Alternatively, or in addition thereto, if the gasket 102 (or a wire embedded within the gasket 102) is cut, this could create a "break" in the circuit, determined when a corresponding reading drops to "zero". A break in the circuit could be an indication that the gasket 102 is being removed, which could lead to glass removal.

Similarly, in some applications, the control system 110 may be placed on the internal portion of the building, or hidden within the fenestration system, in other applications. In some embodiments, the communication link 118 connecting the control system 110 to the control unit 116 is further hidden within the fenestration system and the walls of the building to prevent tampering.

In some embodiments, the system 100 may further include an alarm 122, which may form part of or otherwise be in communication with the control system 110. Operation of the alarm 122 may be triggered when resistance across the gasket 102 deviates from a predetermined or established value (e.g., the baseline resistance) and the control system 110 generates the signal. In some embodiments, the alarm 122 may comprise an audible or visual alarm configured to alert configured to audibly or visually alert a user (e.g., homeowner, building owner, occupant, etc.) of a measured resistance deviation in the gasket 102. In other embodiments, the alarm 122 may be programmed to send a signal to the control system 110, which communicates with the user via a communication alert, such as a text message, an email, a push notification, etc.

Once installed in the system 100, as indicated above, the gasket 102 may serve the primary purpose of sealing specific areas of the fenestration system. However, the gasket 102 may further act as a sensor configured to detect any deflection, deformation, compression, destruction, degradation, damage, or vibration (collectively referred to herein as "disturbances") of the unit. In some embodiments, the gasket 102 may lack a sealing or glazing function, and may instead be installed for the primary purpose of monitoring for any disturbances resulting from tampering or destruction. In further embodiments, the gasket 102 may serve a secondary purpose of monitoring for the deterioration of the sealing or glazing function, such that the system 100 may inform the user when maintenance is required on the gasket 102.

The system 100 of FIG. 1 may be used in conjunction with a variety of fenestration systems including, but not limited to, window assemblies, door assemblies, curtain walls, sliding doors, fixed vents, pivoting vents, glazed roofing assemblies, or any combination thereof. Example uses for the system 100 will now be provided with reference to FIGS. 2-4, which depict cross-sectional views of example fenestration systems that incorporate the principles of the present disclosure.

Figure 2:
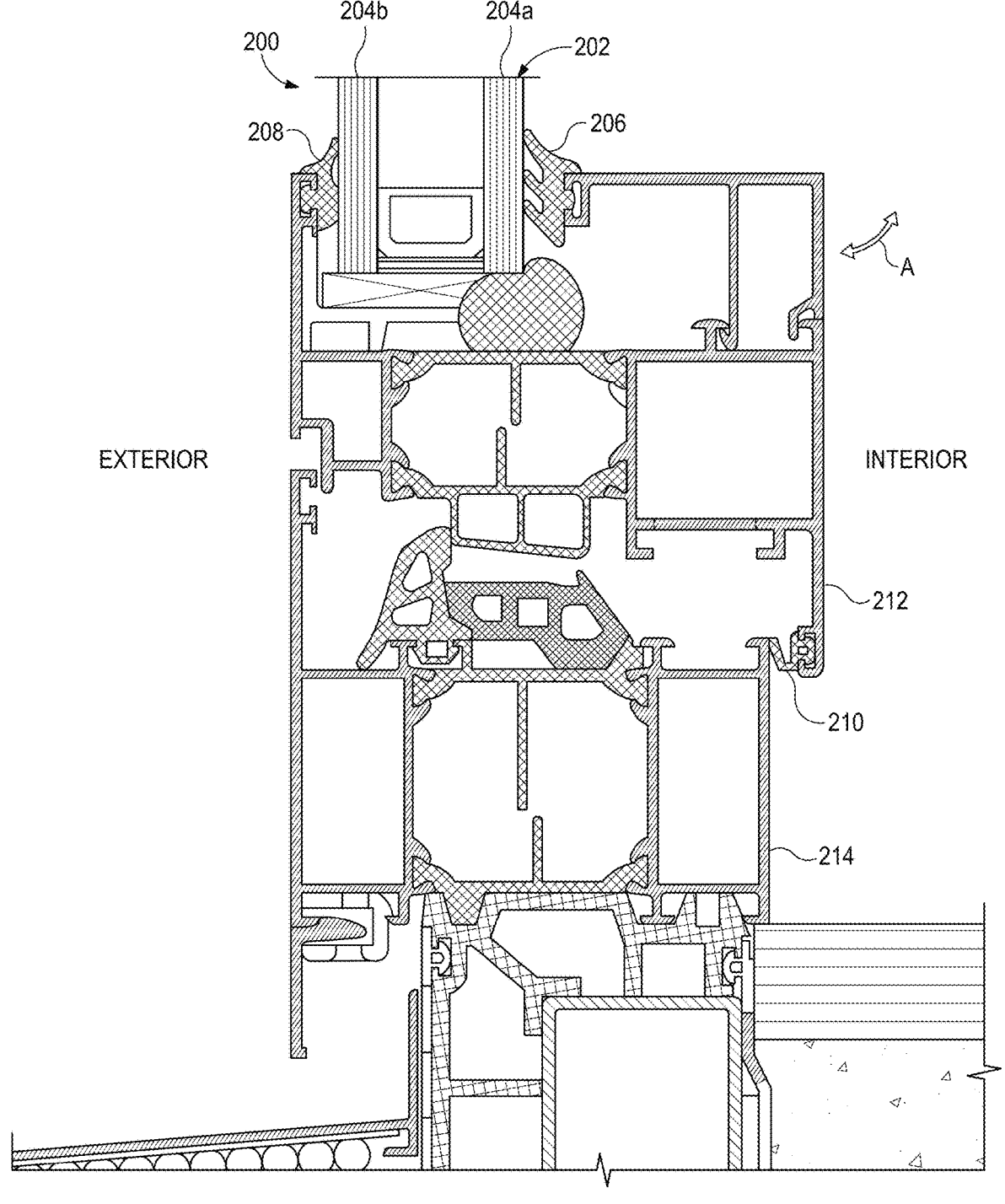
FIGS. 2-4 depict a series of cross-sectional views of example fenestration systems which may incorporate the pressure transducing gasket system of FIG. 1.

FIG. 2 is a cross-sectional side view of an example fenestration system 200 that may incorporate the principles of the present disclosure. The fenestration system 200 comprises a glazing unit or window assembly and, more particularly, a swinging, hinged-type window assembly. Accordingly, the first fenestration system 200 will be referred to herein as the "window assembly 200".

As illustrated, the window assembly 200 includes a sill 212, a sill receptor 214, and a panel 202 secured to the sill 212. In the illustrated embodiment, the sill 212 and the panel 202 may be configured to pivotably open into the interior of the building, as shown by the arrow A, while the sill receptor 214 remains stationary.

The panel 202 may comprise, for example, one or more panes of window glass, polycarbonate, or another clear, translucent, tinted, or opaque material. In the illustrated embodiment, the panel 202 includes a first or "interior" pane 204a and a second or "exterior" pane 204b. The panes 204a,b may be laterally spaced from each other and the space between the panes 204a,b may be filled with air or an inert gas to help control transmission of thermal energy by radiation and convection between the interior of the building and the exterior environment. Accordingly, the panel 202 may comprise a conventional "double-glazed" frame arrangement. It will be appreciated, however, that the principles of the present disclosure may be equally applicable to other glazing panel designs and configurations, including triple-glazed panels and vacuum-integrated glazing and insulated panels, without departing from the scope of the disclosure.

In the illustrated embodiment, an interior glazing gasket 206 is arranged (secured) between the interior pane 204a and an interior portion of the sill 212, and an exterior glazing gasket 208 is arranged (secured) between the exterior pane 204b and an exterior portion of the sill 212. Each gasket 206, 208 may be secured between opposing rigid components of the window system 200, i.e., the panes 204a,b and corresponding portions of the sill 212. In this cross-section view, the extent of the interior and exterior glazing gaskets 206, 208 is not fully visible. However, the interior and exterior glazing gaskets 206, 208 may fully surround the perimeter of their respective panes 204a,b, or may be limited to one side of their respective panes 204a,b.

According to embodiments of the present disclosure, the interior and exterior gaskets 206, 208 form part of the system 100 of FIG. 1. More specifically, the interior glazing gasket 206 may facilitate the detection of a disturbance (e.g., deflection, deformation, compression, destruction, vibration, etc.) to the panel 202 from inside or outside of the building, as well as any tampering with the interior pane 204a or the interior glazing gasket 206 from inside of the building. Similarly, the exterior glazing gasket 208 may be configured to help detect any disturbance to the panel 202 from inside or outside of the building, as well as any tampering with the exterior pane 204a or the exterior glazing gasket 208 from outside of the building.

Accordingly, the gaskets 206, 208 may replace and otherwise operate as the gasket 102 of the system 100 of FIG. 1. A baseline resistance of the gaskets 206, 208 may be read once installed in the window assembly 200. With the baseline resistance determined and recorded, any deflection, deformation, destruction, or vibration (i.e., "disturbance") of the panel 202 may cause the interior glazing gasket 206 or the exterior glazing gasket 208 to be compressed or allowed to expand, which will alter the resistance across the material of either gasket 206, 208. If a measured resistance does not match the baseline resistance, or fall within a pre-defined resistance threshold, that may be an indication that one or both of the gaskets 206, 208 has undergone or is subject to a disturbance and a signal may be generated and sent indicating the same. Further, the glazing gaskets 206, 208 may be utilized to determine the proper installation of any panels 202, such as those installed with beaded glazing, through the comparison of the resistance of the gaskets 206,208 to a predefined baseline for correct installation.

In some embodiments, the window assembly 200 may further include a glazing or sealing gasket 210, alternately referred to as a "weathering" gasket, arranged and otherwise configured to generate a sealed interface between opposing portions of the sill 212 and the sill receptor 214 when the window assembly 200 is moved to the closed position. In some embodiments, as illustrated, the sealing gasket 210 may be attached to the sill 212, but could alternatively be attached to the sill receptor 214, without departing from the scope of the disclosure. Accordingly, the sealing gasket 210 may be secured between opposing rigid components of the window system 200, i.e., the sill 212 and the sill receptor 214.

As the window assembly 200 is transitioned between the open and closed positions, the sealing gasket 210 will deform, e.g., the sealing gasket 210 expands when the window assembly 200 is open and compresses when the window assembly 200 is closed. Similar to the glazing gaskets 206, 208, the sealing gasket 210 may replace the gasket 102 in the system 100 of FIG. 1, and baseline resistance measurements of the sealing gasket 210 may be taken for both the open and closed positions. Accordingly, the sealing gasket 210 may act as a sensor for determining the status of the window assembly 200 as either "open", "closed", or "partially closed", depending on the measured resistance. If a measured resistance does not match the baseline resistance, or fall within a pre-defined resistance threshold, that may be an indication that the window assembly 200 has moved or is being moved to the open position. This information may be used for proper building maintenance, and the determination of an unsealed window assembly 200 may aid in both building security and ecological initiatives.

Figure 3:
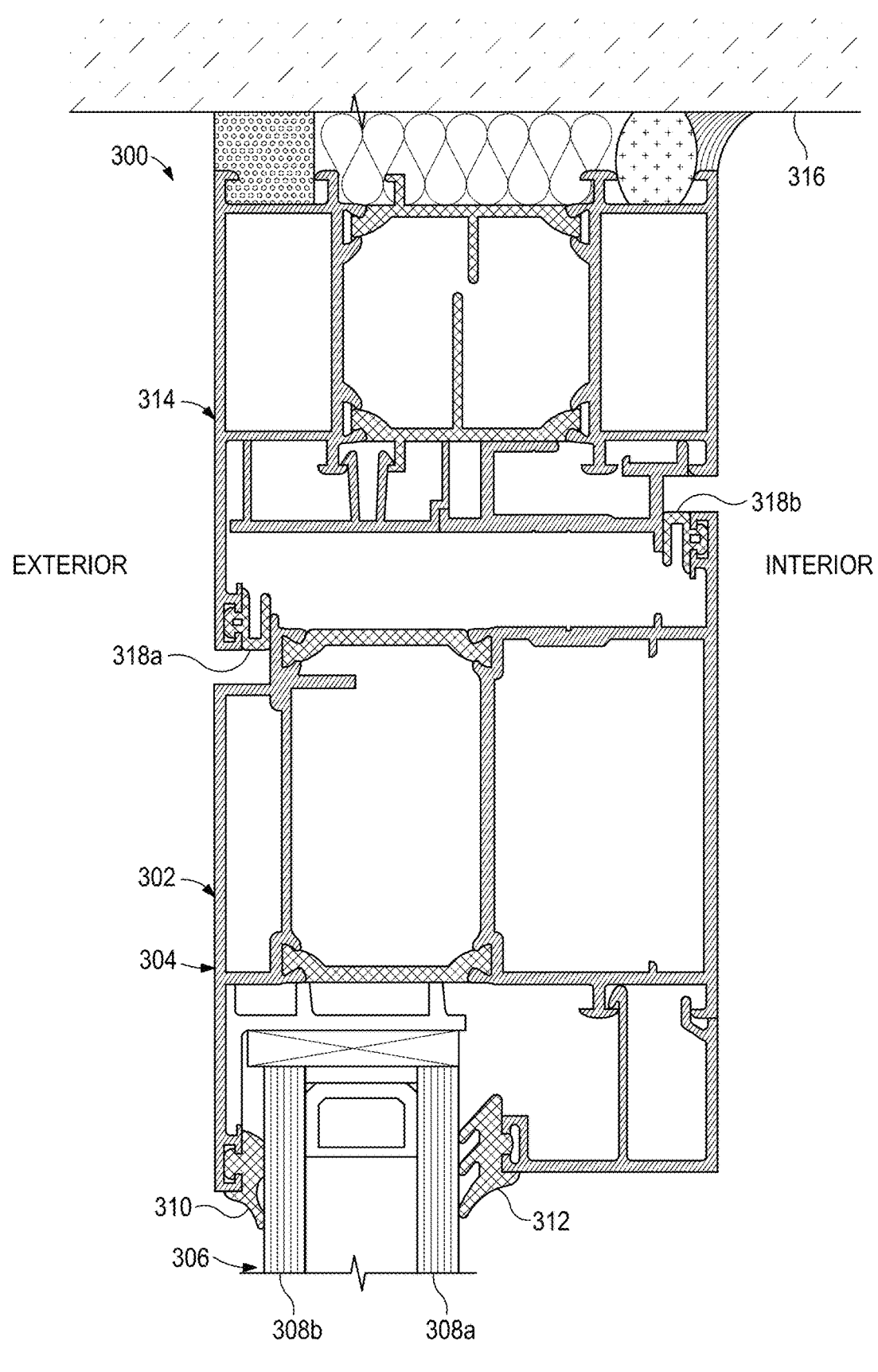

FIG. 3 is a cross-sectional side view of another example fenestration system 300 that may incorporate the principles of the present disclosure. The fenestration system 300 comprises a door assembly that may incorporate one or more systems 100 described with reference to FIG. 1. Accordingly, the fenestration system 300 will be referred to herein as the "door assembly 300".

As illustrated, the door assembly 300 includes a door 302 that includes an upper stile or "head" 304 and a panel 306 mounted to the door 302. The door assembly 300 also includes a door frame 314, such as a head receptor or "header" configured to engage the head 304 of the door 302 when the door 302 is in the closed position. The panel 306 may be similar in some respects to the panel 202 of FIG. 2, and may thus be made of a double-paned glass having a first or "interior" pane 308a and a second or "exterior" pane 308b. The panes 308a,b may be laterally spaced from each other and the space between the panes 308a,b may be filled with air or an inert gas to help control transmission of thermal energy by radiation and convection between the interior of the building and the exterior environment. Accordingly, the panel 306 may comprise a conventional "double-glazed" frame arrangement.

An interior glazing gasket 312 may be arranged (secured) between the interior pane 308a and an interior portion of the head 304, and an exterior glazing gasket 310 may be arranged between the exterior pane 308b and an exterior portion of the head 304. Each gasket 310, 312 may be secured between opposing rigid components of the door assembly 300, the panes 308a,b and corresponding portions of the head 304. Similar to the glazing gaskets 206, 208 of FIG. 2, the glazing gaskets 310, 312 may be utilized to determine the proper installation of the panel 306 (or either pane 308a,b) through comparison of the resistance of the gaskets 310, 312 to a predefined baseline for correct installation. The further functions of the interior and exterior glazing gaskets 310, 312 may be similar or equivalent to that of the interior and exterior glazing gaskets 206, 208 of FIG. 2, and as such will not be described again.

The door frame 314 may be mounted to a lower (bottom) surface 316 of the building or room in which the door assembly 300 is installed, such as the bottom of a concrete slab or the like. The door assembly 300 may further include one or more glazing or sealing gaskets, shown as a first sealing gasket 318a and a second sealing gasket 318b, configured to generate a sealed interface between the door frame 314 and the door 302 when the door 302 is in the closed position. In the illustrated embodiment, the first sealing gasket 318a is secured to the door frame 314, but could alternatively be secured to the door 302. Similarly, the second sealing gasket 318b is shown secured to the door 302, but could alternatively be secured to the door frame 314, without departing from the scope of this disclosure.

The sealing gaskets 318a,b may serve a similar purpose and function as the sealing gasket 210 of FIG. 2, and as such will not be described in further detail. It should be noted that while the sealing gaskets 318a,b are shown within the header section of the door assembly 300, the sealing gaskets 318a,b may run along the entire perimeter of the door 302 and the door frame 314 without departing from the scope of this disclosure.

Figure 4:
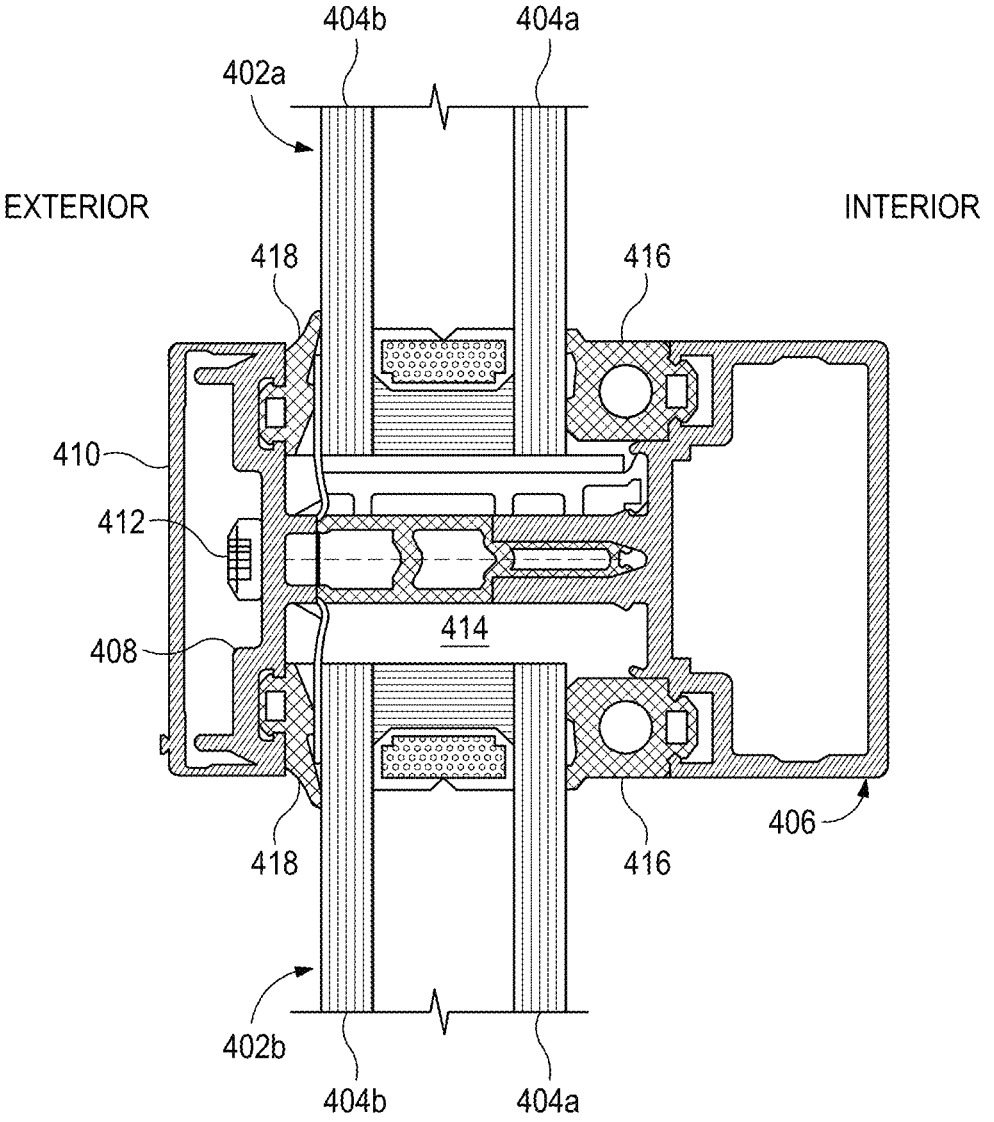

FIG. 4 is a cross-sectional top view of another example fenestration system 400 that may incorporate the principles of the present disclosure. The fenestration system 400 comprises a curtain wall assembly that may incorporate one or more systems 100 described with reference to FIG. 1. Accordingly, the fenestration system 400 will be referred to herein as the "curtain wall assembly 400".

As illustrated, the curtain wall assembly 400 may be configured to help laterally support and/or secure one or more glazing panels, shown as a first glazing panel 402a and a second glazing panel 402b. The glazing panels 402a,b may comprise one or more panes of window glass, one or more panes of polycarbonate, or one or more panels of another material that is clear, translucent, tinted, or opaque, without departing from the scope of the disclosure. As illustrated each glazing panel 402a,b includes a first or "exterior" panel 404a and a second or "interior" panel 404b. The space between the first and second glass panels 404a,b may be filled with air or an inert gas to help control transmission of thermal energy by radiation and convection between the interior of the building and the exterior environment. Accordingly, the glazing panels 404a,b may each comprise a conventional "double-glazed" frame arrangement. It will be appreciated, however, that the principles of the present disclosure may be equally applicable to other glazing panel designs and configurations, including triple-glazed panels and glazing panels with non-transparent insulated panel infills, without departing from the scope of the disclosure.

As illustrated, the curtain wall assembly 400 further includes a vertical member 406, referred to herein as a "mullion." The mullion 406 may comprise a rigid extrusion made of aluminum, an aluminum alloy, or other metals and metal alloys. The curtain wall assembly 400 further includes a pressure plate 408 and a cover 410 removably coupled to the pressure plate 408. The cover 410 provides an architectural finishing detail while simultaneously covering a vertical gap between the first and second glazing panels 402a,b. The pressure plate 408 may be operatively coupled to the mullion 406 with a mechanical fastener 412, which extends through a glazing pocket 414 defined laterally between the mullion 406 and the pressure plate 408. The glazing pocket 414 may also be defined horizontally between the first and second glazing panels 402a,b. The fastener 412 may be received within or otherwise threaded into a portion of the mullion 406.

The curtain wall assembly 400 further includes corresponding vertically-extending interior gaskets 416 that interpose the glazing panels 402a,b and the mullion 406, and corresponding vertically-extending exterior gaskets 418 that interpose the glazing panels 402a,b and the pressure plate 408. Accordingly, each gasket 416, 418 may be secured between opposing rigid components of the curtain wall assembly 400; e.g., the first and second glazing panels 402a,b and the mullion 406 or the pressure plate 408. While the illustrated embodiment depicts the vertical sections of the curtain wall assembly 400, such as the mullion 406, the discussion herein may be equally applicable to horizontal sections of the curtain wall assembly 400, such as a transom (not shown).

The interior and exterior glazing gaskets 416, 418 may be similar or equivalent to that of the interior and exterior glazing gaskets 206, 208 of FIG. 2, and as such will not be described in any further detail.

Since the mullion 406 and the pressure plate 408 are mated through the use of the fastener 412, prior measurements of the resistance through the glazing gaskets 416, 418 may be taken for properly installed threaded fasteners 412, and the measurements may be used as a baseline for further installation. Therefore, during installation of the threaded fastener 412, the proper installation of the curtain wall assembly 400 may be monitored and assessed through the resistance measured through the interior glazing gaskets 416 and exterior glazing gaskets 418. Any deviation from the baseline resistance, outside of a predefined threshold, may indicate an over-tightened or under-tightened threaded fastener 412. Further, after installation, any tampering to the threaded fastener 412 may be detected through the simultaneous change in resistance for the interior glazing gaskets 416 and exterior glazing gaskets 418.

In addition to the functions and uses of the gaskets described herein above, the pressure-transducing gasket systems described herein may also be useful and otherwise incorporated into the motorization and automation of windows and door systems. In such embodiments, the gasket systems may help ensure that the window or door stop in a safe way if they are obstructed. The gasket sensor could be used to detect obstructions when a door or window is being closed, and the sensor could then be used as part of a closed loop feedback system to tell the motor that there is an obstruction and to stop closing.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, and the like are used in relation to the illustrative embodiments as they are depicted in the figures, the upward direction being toward the top of the corresponding figure and the downward direction being toward the bottom of the corresponding figure.

The invention claimed is:

1. A fenestration system, comprising:
opposing first and second rigid components;
a gasket interposing the first and second rigid components, the gasket being made of an electrically-conductive material and exhibiting a baseline resistance when arranged between the first and second rigid components;
three or more wires coupled to the gasket along a length thereof; and
a control system communicably coupled to the gasket with the three or more wires and operable to:
monitor, with the three or more wires, a plurality of real-time, localized resistances of the gasket; and
generate a signal when at least one of the real-time, localized resistances deviates from the baseline resistance.

2. The system of claim 1, wherein the electrically-conductive material is selected from the group consisting of ethylene propylene diene monomer rubber, a conductive foam, a conductive elastomer, and any combination thereof.

3. The system of claim 1, further comprising a power source that provides electrical power to the control system and the three or more wires.

4. The system of claim 1, further comprising a control unit communicably coupled to the control system and operable to provide a visual display of a status of the control system, report the status to a building management system, report the status to a smart home system, or any combination thereof.

5. The system of claim 1, wherein the real-time, localized resistances deviate from the baseline resistance when the gasket undergoes a disturbance.

6. The system of claim 1, wherein the fenestration system comprises a window assembly and the first rigid component comprises a sill and the second rigid component comprises a panel comprising one or more window panes.

7. The system of claim 1, wherein the fenestration system comprises a window assembly and the first rigid component comprises a sill and the second rigid component comprises a sill receptor.

8. The system of claim 1, wherein the fenestration system comprises a door assembly and the first rigid component comprises a stile and the second component comprises a panel comprising one or more panes of glass.

9. The system of claim 1, wherein the fenestration system comprises a door assembly and the first rigid component comprises a door frame and the second component comprises a door.

10. The system of claim 1, wherein the fenestration system comprises a curtain wall assembly and the first rigid component comprises a mullion or transom or a pressure plate and the second rigid component comprises one or more glazing panels.

11. The system of claim 1, wherein the fenestration system comprises a curtain wall assembly comprising a mullion or transom, a pressure plate, and a fastener, and wherein installation of the fastener is monitored through the real-time resistance of the gasket installed within the curtain wall assembly.

12. The system of claim 1, wherein the gasket operates as a glazing or sealing gasket.

13. The system of claim 1, further comprising an alarm in communication with the control system and operable to generate an audible or visual alarm upon receipt of the signal.

14. A method of monitoring a fenestration system that includes:
opposing first and second rigid components;
a gasket interposing the first and second rigid components and being made of an electrically-conductive material;
three or more wires coupled to the gasket along a length thereof; and
a control system communicably coupled to the gasket with the three or more wires, wherein the method comprises:
measuring a baseline resistance of the gasket;
monitoring, with the three wires, a plurality of real-time, localized resistances of the gasket with the control system; and
generating a signal with the control system when at least one of the real-time, localized resistances deviates from the baseline resistance.

15. The method of claim 14, wherein measuring the baseline resistance across the gasket comprises measuring the baseline resistance when the gasket is arranged between the first and second rigid components.

16. The method of claim 14, further comprising at least one of:
providing a visual display of a status of the control system with a control unit communicably coupled to the control system;

report the status to a building management system with the control unit; and report the status to a smart home system with the control unit.

17. The method of claim 14, further comprising subjecting the gasket to a disturbance and thereby deviating at least one of the real-time, localized resistances from the baseline resistance.

18. The method of claim 14, further comprising performing a sealing function with the gasket.

19. The method of claim 14, wherein the step of generating the signal comprises triggering an alarm in communication with the control system.

20. A fenestration system, comprising:

opposing first and second rigid components;

a gasket made of an electrically-conductive material and interposing the first and second rigid components, the gasket including opposing first and second ends, and exhibiting a baseline resistance when arranged between the first and second components;

a first wire coupled to the first end of the gasket;

a second wire coupled to the second end of the gasket;

a third wire coupled to the gasket at a location intermediate to the first and second ends; and a control system communicably coupled to the gasket with the first, second, and third wires and operable to:

monitor, with the first and second wires, a first localized resistance of the gasket;

monitor, with the second and third wires, a second localized resistance of the gasket; and generate a signal when at least one of the first or second localized resistances deviates from the baseline resistance.

* * * * *